United States Patent [19]

Inata et al.

[11] Patent Number: 5,300,621
[45] Date of Patent: Apr. 5, 1994

[54] SEMICRYSTALLINE AROMATIC POLYESTER, PROCESS FOR ITS PRODUCTION AND RESIN COMPOSITION CONTAINING IT

[75] Inventors: Hiroo Inata; Shunichi Matsumura; Nobuaki Kido, all of Iwakuni; Toshio Hatayama, Sagamihara, all of Japan

[73] Assignee: Teijin Limited, Osaka, Japan

[21] Appl. No.: 12,631

[22] Filed: Feb. 3, 1993

[30] Foreign Application Priority Data

Feb. 13, 1992 [JP] Japan ................................. 4-026643
Jul. 20, 1992 [JP] Japan ................................. 4-192089

[51] Int. Cl.$^5$ ...................... C08G 63/00; C08G 63/02
[52] U.S. Cl. .................................. 528/195; 528/176; 528/193
[58] Field of Search ................ 528/176, 193, 272, 195

[56] References Cited

FOREIGN PATENT DOCUMENTS

| | | |
|---|---|---|
| 0382486 | 8/1990 | European Pat. Off. |
| 63-256675 | 10/1988 | Japan |
| 4202316 | 7/1992 | Japan |
| 1026993 | 5/1964 | United Kingdom |
| 2114141 | 8/1983 | United Kingdom |

OTHER PUBLICATIONS

Chemical Abstracts vol. 89, No. 14, 1978, Columbus, Ohio, Abstract No. 111230G & JPA-53036595 (Teijin) Apr. 4, 1978; & JPB-60016963 (Teijin) 30.04.18=985.
Chemical Abstracts, vol. 89, No. 14, 1978, Columbus, Ohio; Abstract No. 110807P; & JPA-53043797 (Teijin) Apr. 20, 1978.
World Patent Index, week 8719, Derwent Publ. Ltd., London, GB; Accession No. 87132587; & JPA 62072746 (Teijin) Apr. 3, 1987.

*Primary Examiner*—John Kight, III
*Assistant Examiner*—Terressa M. Mosley
*Attorney, Agent, or Firm*—Sherman and Shalloway

[57] ABSTRACT

An aromatic polyester:
(1) consisting essentially of a polymer unit A of the formula (1),

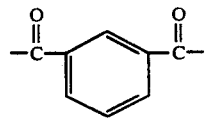 (1)

a polymer unit B of the formula (2),

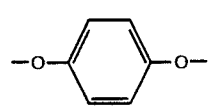 (2)

and a polymer unit C of the formula (3),

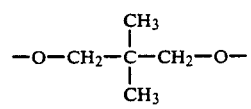 (3)

the above polymer units being bonded together forming ester linkages in a polymer chain,
(2) the polymer unit C being contained in an amount of 10 to 35 mol % based of the total amount of the polymer units B and C,
(3) the polyester being semicrystalline,
(4) the polyester having an inherent viscosity, measured in a phenol/1,1,2,2-tetrachloroethane mixed solvent (weight ratio=60/40) at 35° C., of at least 0.3; a process for its production; and a resin composition containing it.

27 Claims, No Drawings

SEMICRYSTALLINE AROMATIC POLYESTER, PROCESS FOR ITS PRODUCTION AND RESIN COMPOSITION CONTAINING IT

DETAILED DESCRIPTION OF THE INVENTION

The present invention relates to a semicrystalline aromatic polyester, a process for the production thereof and a resin composition containing the same. More specifically, the present invention relates to a semicrystalline aromatic polyester being excellent in heat resistance, frame retardancy, mechanical properties and moldability and being semicrystalline, i.e., crystalline in a solid state and optically isotropic in a molten state, a process for its production and a resin composition containing it.

U.S. Pat. No. 3,036,991 discloses a linear superpolyester of p-phenylene isophthalate units interspersed with p,p'-biphenylene isophthalate units, the intrinsic viscosity of said superpolyester being at least 0.5 and the p-phenylene isophthalate units being at least 40 mole percent of the total p-phenylene isophthalate and p,p'-biphenylene isophthalate units in said superpolyester.

U.S. Pat. No. 3,160,602 discloses a process of producing a linear superpolyester of an aromatic dicarboxylic acid and a dihydric phenol which comprises reacting a mixture of reactants consisting essentially of an aromatic dicarbonyl halide and a dihydric phenol, while these reactants are dissolved in a solvent selected from the group consisting of benzophenone, m-terphenyl, chlorinated biphenyl, brominated biphenyl, chlorinated diphenyl oxide and brominated diphenyl oxide, at a temperature in the range of about 270° C. up to the reflux temperature of the solution until at least the evolution of the hydrogen halide substantially ceases, by which time the superpolyester formed has an intrinsic viscosity of at least 0.5 measured at 75° C., and isolating the solid polymer from the reaction mixture.

Japanese Laid-Open Patent Publication 47019/1983 discloses a process for the production of an aromatic copolyester which comprises melt-polymerizing a mixture containing diaryl isophthalate, hydroquinone and 4,4'-dioxybiphenyl or a mixture containing isophthalic acid, hydroquinone, 4,4'-dioxybiphenyl and diaryl carbonate, and then optionally subjecting the resultant polymer to solid phase polymerization.

European Laid-open Patent Application No. 0 472 366 discloses a semicrystalline wholly aromatic polyester:

(1) which consists essentially of: a polymer unit A of the formula

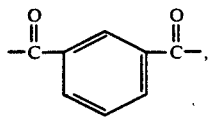

a polymer unit B of the formula

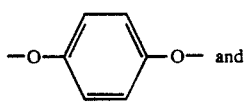 and a polymer unit C of the formula

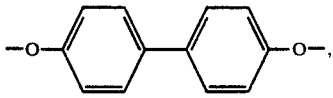

these polymer units being bonded together to form an ester having a linkage (—COO—), (2) which has a melting point satisfying the following relationship, $$-2.X+370 < Tm(°C.) < -2.X+388$$

wherein X is a molar ratio (percent) of the polymer unit C to the total of the polymer units B and C, and Tm is a melting point (°C.) of the polyester, provided that X is a number in the range of 10 to 35 mol %, and (3) which has an inherent viscosity, measured in a phenol/tetrachloroethane mixed solvent having a phenol/tetrachloroethane weight ratio of 60/40 at 35° C., in the range of 0.4 to 2, and a process for the production thereof.

Japanese Laid-open Patent Application No. 16963/1985 discloses a process for producing a polyester, in which an aromatic dicarboxylic acid A, dihydroxybenzene B in an amount of 5 to 65 mol % based on the component A, aliphatic diol C in an amount of 0 to 80 mol % based on the component A and an aromatic monohydroxy compound D in such an amount that the total amount of the components B, C and D is at least 180 mol % based on the component A are subjected to an esterification reaction in the presence or absence of a medium until the reaction ratio of the carboxyl groups of the component A reaches at least 80%, and then the same component C as above in such an amount that the total amount of the component C used in the above esterification reaction and the newly added component C is 0 to 80 mol % based on the component A and bisphenol in such an amount that the total amount of the bisphenol, the component B, the component C used in the above esterification reaction and the newly added component C is 95 to 130 mol % based on the component A are added to the above-obtained esterification reaction product to allow the resultant mixture to react. The polyester obtained by the process disclosed in the above Japanese Laid-open Patent Application No. 16963/1985 has characteristic features in that the content of a polymer unit derived from the dihydroxybenzene is much lower than 65 mol %, that it contains a substantial amount of a polymer unit derived from the bisphenol, and that it is amorphous.

It is therefore an object of the present invention to provide a novel semicrystalline aromatic polyester.

It is another object of the present invention to provide a semicrystalline aromatic polyester having excellent moldability, which has high crystallinity and a high melting point (Tm) and further has a low second-order transition point (Tg) and which shows a low viscosity in a molten state.

It is another object of the present invention is to provide a semicrystalline aromatic polyester which is excellent in heat resistance, flame retardancy, mechanical properties and moldability, and is optically isotropic in a molten state.

It is further another object of the present invention to provide a semicrystalline aromatic polyester which exhibits the above-described excellent properties but is inexpensive.

It is further another object of the present invention to provide a process for the production of the above semicrystalline aromatic polyester of the present invention very advantageously in industry.

Further, it is another object of the present invention to provide a reinforced resin composition containing the above semicrystalline aromatic polyester of the present invention.

It is still further another object of the present invention to provide a flame-retardant composition containing the semicrystalline aromatic polyester of the present invention.

The above objects and advantages and other objects and advantages of the present invention will be apparent from the following description.

According to the present invention, the above objects and advantages of the present invention are achieved, first, by a novel semicrystalline aromatic polyester:

(1) consisting essentially of a polymer unit A of the formula (1),

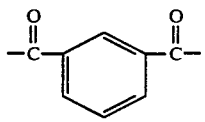
(1)

a polymer unit B of the formula (2),

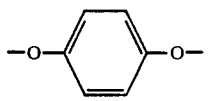
(2)

and a polymer unit C of the formula (3),

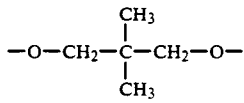
(3)

the above polymer units being bonded together forming ester linkages in a polymer chain, (2) the polymer unit C being contained in an amount of 10 to 35 mol % based on the total amount of the polymer units B and C, (3) the polyester being semicrystalline, (4) the polyester having an inherent viscosity, measured in a phenol/1,1,2,2-tetrachloroethane mixed solvent (weight ratio=60/40) at 35° C., of at least 0.3.

The above semicrystalline aromatic polyester of the present invention consists essentially of an isophthalic acid moiety (polymer unit A), a hydroquinone moiety (polymer unit B) and a neopentylene glycol moiety (polymer unit C), and these polymer units are bonded together to form an ester having a linkage (—COO—).

One ester linkage is formed between a polymer unit A and a polymer unit B, and another ester linkage is formed between a polymer unit A and a polymer unit C. It is therefore understood that the aromatic polyester of the present invention consists essentially of the following units forming an ester linkage, i.e. a recurring AB of the formula (1-2)

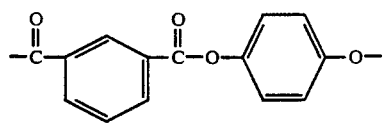
(1-2)

and a recurring unit AC of the formula (1-3)

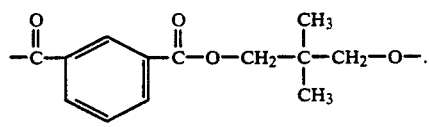
(1-3)

In the aromatic polyester of the present invention, the amount of the polymer unit C on the basis of the total of the polymer units B and C is 10 to 35 mole %, preferably 15 to 30 mole %.

The aromatic polyester of the present invention is a random copolymer comprising the recurring unit AB/recurring unit AC molar ratio of preferably 90/10 to 65/35, more preferably 85/15 to 70/30.

Although differing depending upon copolymer ratio, the melting point of the aromatic polyester of the present invention is preferably between 380° and 280° C.

Further, the aromatic polyester of the present invention is advantageously produced by directly heat-melting a starting material which consists essentially of isophthalic acid, hydroquinone and neopentylene glycol.

According to the present invention, therefore, there is provided a process for producing a semicrystalline aromatic polyester having an inherent viscosity of at least 0.3, which comprises heat-melting a starting material consisting substantially of isophthalic acid (a), hydroquinone (b) and neopentylene glycol (c) in amounts which simultaneously satisfy the following expressions (i) and (ii), $$1.3 \geq (B+C)/A \geq 0.9 \quad \text{(i)}$$

$$90/10 \geq B/C \geq 65/35 \quad \text{(ii)}$$

wherein A is a molar amount of the isophthalic acid (a), B is a molar amount of the hydroquinone (b) and C is a molar amount of the neopentylene glycol (c), in the presence of an esterifying catalyst.

In the process of the present invention, the compounds (a), (b) and (c) are, as described above, used in amounts which simultaneously satisfy the following expressions, $$1.3 \geq (B+C)/A \geq 0.9 \quad \text{(i)}$$

$$90/10 \geq B/C \geq 65/35 \quad \text{(ii)}$$

wherein A is a molar amount of the isophthalic acid (a), B is a molar amount of the hydroquinone (b) and C is a molar amount of the neopentylene glycol (c), The former expression (i) defines that the isophthalic acid (a) and the dihydroxy compounds (i.e., the hydroquinone (b) and the neopentylene glycol (c)) should be used in proper amounts to form a polymer chain. Namely, when the expression (i) is not satisfied, it is difficult to obtain a polymer having a high polymerization degree, and a polymer being produced is liable to be colored.

The amounts of the compounds (a), (b) and (c) preferably satisfy the following expression (ia).

$$1.2 \geq (B+C)/A \geq 1.0 \qquad (ia)$$

The latter expression (ii) is aimed for defining the contents of polymer units derived from the hydroquinone (b) and the neopentylene glycol (c) in the resultant aromatic polyester. When the hydroquinone (b)/neopentylene glycol (c) molar ratio, B/C, exceeds 90/10, undesirably, the resultant polymer is liable to have too high a melting point, and it is made difficult to melt-polymerize and mold the polymer. When this B/C is less than 65/35, undesirably, the polymer shows low crystallinity and poor heat resistance. The hydroquinone (b) and the neopentylene glycol (c) preferably satisfy the following expression (iia), more preferably the following expression (iib).

$$90/10 \geq B/C \geq 70/30 \qquad (iia)$$

$$85/15 \geq B/C \geq 70/30 \qquad (iib)$$

In the process of the present invention, as required, there may be used a phenol (d) optionally substituted with an alkyl group having 1 to 5 carbon atoms in addition to the above compounds (a), (b) and (c).

Examples of the above phenol (d) preferably include phenol, m-cresol, p-cresol, p-butylphenol and p-amylphenol. Of these, preferred are phenol and cresol, and particularly preferred is phenol.

The above phenol (d) is used not as a component which is to constitute the aromatic polyester, but works as a reaction medium at an initial stage of the reaction of the above compounds (a), (b) and (c).

It is therefore not necessarily required to use the above phenol (d). When it is used, however, the reaction rapidly proceeds, the reaction product hardly decomposes, and the coloring occurs to a lesser degree. It is, therefore, desirable to use the above phenol (d). The phenol (d) is used preferably in an amount which satisfies the expression of $D/A \geq 10$ in which A is a molar amount of the compound (a) and D is a molar amount of the phenol (d). This expression is preferably $4 \geq D/A \geq 0.2$, more preferably $2 \geq D/A \geq 0.3$.

In the process of the present invention, the above compounds (a), (b) and (c) and optionally the phenol (d) are melted and reacted under heat in the presence of an esterifying catalyst.

The esterifying catalyst is selected, for example, from antimony trioxide, tin (II) acetate, dibutyltin oxide, germanium oxide and titanium tetrabutoxide.

During the above melting under heat, the esterification and ester interchange reaction proceed to form the aromatic polyester. The reaction in melting under heat can be classified into an initial reaction and polymerization for conveniently explaining the same.

The initial reaction refers to a stage at which at least 50% of carboxyl groups of the isophthalic acid (a) react with hydroxy components (i.e., the hydroquinone (b), the neopentylene glycol (c) and optionally the phenol (d)) to form an ester. At this stage, water is formed due to the reaction, and therefore, the water is distilled off out of the reaction system. It is necessary to take care not to distill the hydroxy components out of the reaction system at this stage.

The polymerization to take place after the initial reaction refers to a stage at which the esterification further proceeds and, at the same time, the ester interchange between the so-formed ester and the remaining hydroxy groups proceeds, whereby the polymerization proceeds. At this stage, the phenol (d) as well as water are distilled out of the reaction system. Although it is difficult to draw a distinct line between the initial reaction and the polymerization, these two reactions can be separated in that the distilling of the hydroxy components out of the reaction system is positively prevented in the initial reaction and that the hydroxy components are distilled out during the polymerization. Although differing depending upon a catalyst, the reaction temperature in the initial reaction is preferably at least 150° C., more preferably at least 180° C., particularly preferably at least 230° C. Further, the reaction temperature is preferably increased as the reaction proceeds. In this case, the upper limit of the reaction temperature is 330° C., preferably about 300° C.

The initial reaction can be carried out under pressure of from atmospheric pressure to elevated pressure. When the reaction temperature is set at a temperature particularly higher than the boiling points of the neopentylene glycol and phenol (d), the initial reaction is preferably carried out under elevated pressure. The reaction system is preferably under the atmosphere of an inert gas such as a nitrogen or argon gas.

The reaction time can be set for a period of time sufficient for carrying out the above esterification fully, and this period of time differs depending upon a reaction temperature and a reaction scale. The reaction time is preferably approximately 30 minutes to 20 hours, more preferably approximately 1 to 10 hours.

In the above reaction, it is preferred to remove water formed by the esterification out of the reaction system. The esterification is an equilibrium reaction, and as the formed water is removed out of the system, the esterification proceeds to improve the yield and purity of the product. The formed water can be removed out of the system on the basis of a difference of the boiling point thereof and the boiling point of the phenol (d). The formed water can be also azeotropically removed out of the reaction system in the presence of an organic solvent which forms an azeotrope with water. This organic solvent can be selected from those which themselves do not decompose under the reaction conditions but are substantially stable in the reaction system and which can form an azeotrope with water. Specifically, preferred are aromatic hydrocarbons such as toluene, xylene and ethylbenzene.

The esterification ratio in the initial reactions preferably set at 50% or more. The esterification ratio can be obtained on the basis of the amount of water formed by the esterification. It can be also obtained more exactly by taking out part of the reaction product and measuring its unreacted-COOH value. The esterification ratio in the initial reaction is more preferably 60 to 95%, particularly preferably 70 to 95%.

The polymerization is preferably carried out at a temperature between the initial reaction temperature and 380° C. In the present invention, it is required to carry out the polymerization while the polyester is in a molten state. As the polymerization proceeds, the melting point of the reactant increases. It is hence preferred to carry out the polymerization while gradually increasing the temperature. For example, when a polymer has an inherent viscosity of up to about 0.5, the melt-polymerization is carried out preferably at a temperature approximately between 280° and 340° C. When a polymer has a higher inherent viscosity than the above, the melt-polymerization is carried out preferably at a temperature approximately between 340° and 380° C., more preferably at a temperature approximately between 340° and 360° C. When the phenol (d) is used in this case, it is recovered and recycled.

In order to obtain a polymer having a higher polymerization degree, it is preferred to carry out the polymerization with an extruder type reactor.

The polymerization is advantageously carried out under reduced pressure or in an inert gas current, while water formed as a result of the reaction and optionally the phenol (d) and an excess of hydroquinone are removed out of the reaction system.

According to the present invention, therefore, there is obtained a crystalline and isotropic aromatic polyester having an inherent viscosity of at least 0.3, preferably 0.4 to 1.5 by carrying out the melt-polymerization alone. The inherent viscosity of the aromatic polyester is more preferably 0.45 to 1.0, particularly preferably 0.5 to 1.0.

It can be understood that the present invention provides, as a preferred embodiment, a process for producing a polymer having an intended polymerization degree by carrying out the above melt-polymerization under heat, first, until at least 50%, preferably 60 to 90%, particularly 70 to 95% of carboxyl groups of the starting materials are esterified while distilling off formed water out of the reaction system under conditions where the hydroxy component is hardly distilled off out of the reaction system and then further distilling off formed water and optionally the phenol (d) out of the reaction system.

In the process of the present invention, the polymerization is preferably carried out in the presence of a heat stabilizer, and a phosphorus compound is preferred as a heat stabilizer. The phosphorus compound is selected preferably from phosphorous acid, phosphoric acid, triphenyl phosphite, triphenyl phosphate and triphenyl phosphine. The amount of this stabilizer based on the isophthalic acid (a) is approximately 0.001 to 1 mol %, more preferably approximately 0.01 to 0.5 mol %. The heat stabilizer is preferably added after the initial reaction, but before the polymerization.

The polyester of the present invention can be also produced by other methods such as (1) a method in which predetermined amounts of diphenyl aromatic dicarboxylate, hydroquinone and neopentylene glycol are allowed to react and (2) a method in which predetermined amounts of aromatic dicarboxylic acid dichloride, hydroquinone and neopentylene glycol are allowed to react. However, the process of the present invention can produce the intended polymer at a low cost, since isophthalic acid, hydroquinone and neopentylene glycol as raw materials can be used as they are. Further, the process of the present invention has an advantage that a polymer having excellent moldability can be obtained as compared with other processes.

The semicrystalline aromatic polyester of the present invention is optically isotropic in a molten state and has a relatively low second-order transition point and a low viscosity. Therefore, it can be subjected to ordinary melt-molding such as extrusion molding and injection molding. Further, since molded articles obtained by melt-molding the aromatic polyester are not only excellent in mechanical properties, dimensional stability, heat resistance, chemical resistance and flame retardancy, but also have low water absorption properties, the aromatic polyester is very useful as a material for forming an engineering plastic, a fiber and a film.

According to the present invention, there is further provided a molding reinforced resin composition which embodies the above excellent properties of the aromatic polyester of the present invention.

That is, the present invention provides a molding resin composition (to be referred to as "first composition" hereinafter) containing 100 parts by weight of the aromatic polyester (P) of the present invention and 5 to 250 parts by weight of a fibrous reinforcement (F).

Examples of the above fibrous reinforcement (F) include a glass fiber, a carbon fiber, an aramid fiber, a silicon carbide fiber, an alumina fiber and a potassium titanate fiber. These reinforcements may have the form of whiskers. The fibrous reinforcement preferably has an aspect ratio of at least 10. When the fibrous reinforcement has a distribution in the aspect ratio, the aspect ratio average is taken as an aspect ratio of the fibrous reinforcement. When the aspect ratio is less than 10, the reinforcement effect on mechanical properties and heat resistance is liable to be insufficient. The fibrous reinforcement preferably has a length of 0.5 to 10 mm. Of the above fibers, a glass fiber is particularly preferred.

For improving the affinity with the above aromatic polyester (P) or improving the handling properties of a fiber per se, it is preferred to properly apply a surface treating agent such as a coupling agent or a sizing agent to these fibrous reinforcement (F).

The amount of the fibrous reinforcement (F) per 100 parts by weight of the aromatic polyester (P) is 5 to 200 parts by weight, preferably 10 to 150 parts by weight, particularly preferably 15 to 100 parts by weight.

In addition to the above two components (P) and (F), the first composition may contain, as required, a filler, a nucleating agent, a lubricant, a mold-releasing agent, an antioxidant, an ultraviolet absorber, a pigment, a plasticizer, an antistatic agent and a powdery, granular or plate-like inorganic filler. It is particularly preferred to use a nucleating agent (N). The amount of the nucleating agent (N) per 100 parts by weight of the aromatic polyester (P) is preferably 0.1 to 10 parts by weight. Talc is particularly preferred as the nucleating agent (N).

The aromatic polyester (P), the fibrous reinforcement (F) and optionally other additive(s) can be mixed by an ordinary compounding method using an extruder.

The first composition of the present invention, produced as described above, can be molded into a housing of an electric or electronic part, a print circuit substrate and other molded article by an ordinary melt-molding method such as an injection molding method, a compression molding method or an extrusion method. Further, it can be produced into an electric connecter having a desired form by integrating it with an electrically conductive material when or after molded.

Preferred examples of electric or electronic parts in which the first composition of the present invention is used are those having a housing formed from the above composition. The electric and electronic parts include a diode, transistor, other semiconductor device, a rectifying device, an integrated circuit, a resister, a variable resister and a condenser.

As a method for improving the density of electronic parts to be mounted on the surface of a print circuit substrate, there is known a reflow method in which solder is spotted on those places of the substrate where electronic parts are to be fixed and the electronic parts are tentatively fixed on the places, and thereafter the solder is melted by means of infrared light or hot air to fix the electronic parts. This reflow method makes it possible to increase the density of electronic parts to be mounted on the substrate surface. However, resins forming conventional electronic parts cannot be said to be satisfactory in heat resistance, and in particular, a reflow method in which the part is heated with infrared light has a problem in that the part surface has too high a temperature locally. However, the above first composition of the present invention exhibits excellent heat resistance and hence, the heating temperature at a soldering step according to the reflow method can be set at a high temperature, and the reliability of the soldering and the yield of products can be improved.

For example, an electric or electronic part whose housing is formed from the first composition of the present invention is fixed on a print circuit substrate by the reflow method as follows.

Solder is placed in the form of dots on those places of circuits formed on a print circuit substrate where electric or electronic parts are to be mounted, and then electronic or electric parts whose housings are formed from the first resin composition of the present invention are tentatively fixed on the substrate with an adhesive. In this case, the terminals of the parts to be fixed are placed such that they are in contact with the solder placed in the form of dots. The substrate on which the electric or electronic parts are tentatively fixed is placed in a reflow furnace using infrared light or hot air, and the solder is melted by heating the substrate to solder the circuits and the terminals of the electric or electronic parts. Housing produced by molding the first composition of the present invention are stable in the above soldering by the reflow method.

According to the present invention, there is also similarly provided a molding resin composition (to be referred to as "second composition" hereinafter) containing 100 parts by weight of the aromatic polyester (P) of the present invention, 1 to 200 parts by weight of a crystalline thermoplastic resin (T) other than the above aromatic polyester (P), and 5 to 250 parts, per 100 parts by weight of the aromatic polyester (P) and the crystalline thermoplastic resin (T) in total, of a fibrous reinforcement (F).

Examples of the crystalline thermoplastic resin (T) preferably include aromatic polyester other than the aromatic polyester (P), polyphenylene sulfide, liquid-crystal, wholly aromatic polyester and polyether ketone.

As the aromatic polyester other than the aromatic polyester (P), preferred is polyethylene terephthalate. As this polyethylene terephthalate, preferred is polyethylene terephthalate whose ethylene terephthalate recurring unit is at least 90 mol % based on the total content of its recurring units. The inherent viscosity, measured in o-chlorophenol at 35° C., of this polyethylene terephthalate is preferably 0.3 to 1.3, more preferably 0.5 to 1.0.

The above polyphenylene sulfide is preferably composed of recurring units of a p-phenylene sulfide skeleton. The polyphenylene sulfide may be partially crosslinked. It is commercially available in the trade names of Ryton (supplied by Phillips Petroleum) and Fortron (supplied by Polyplastics Co., Ltd).

As the above liquid-crystal wholly aromatic polyester (LCPII), preferred is, for example, a copolymer in which p-hydroxybenzoic acid components and 2-hydroxy-6-naphthoic acid components bond at random to form ester bonds. This copolymer is known as a liquid-crystal polymer type II in engineering plastics, and it is commercially available, for example, in the trade name of Vectra (supplied by Polyplastics Co., Ltd.).

As the above polyether ketone, preferred is a polymer in which an aromatic ring, preferably a benzene ring, is bonded in the para-position through an ether group (—O—) or a carbonyl group (—CO—). This polyether ketone is commercially available, for example, in the trade name of "VICTREX PEEK" (supplied by ICI).

The fibrous reinforcement (F) is selected from those described regarding the first composition of the present invention.

The amount of the crystalline thermoplastic resin (T) per 100 parts by weight of the aromatic polyester (P) is 1 to 200 parts by weight, preferably 2 to 150 parts by weight, more preferably 3 to 100 parts by weight.

The amount of the fibrous reinforcement (F) per 100 parts by weight of the aromatic polyester (P) and the crystalline thermoplastic resin (T) in total is 5 to 250 parts by weight, preferably 10 to 200 parts by weight, more preferably 15 to 150 parts by weight.

As the above fibrous reinforcement, preferred is a glass fiber.

In addition to the above components (P), (T) and (F), the second composition of the present invention may contain, as required, a flame retardant, a flame retardant aid, a filler, a nucleating agent, a lubricant, a mold-releasing agent, an antioxidant, an ultraviolet absorber, a pigment, a plasticizer, an antistatic agent and a powdery, granular or plate-like inorganic filler. It is particularly preferred to use a nucleating agent (N). The amount of the nucleating agent (N) per 100 parts by weight of the aromatic polyester (P) is preferably 0.1 to 10 parts by weight. Talc is particularly preferred as the nucleating agent (N).

The aromatic polyester (P), the crystalline thermoplastic resin (T), the fibrous reinforcement (F) and optionally other additive(s) can be mixed by an ordinary compounding method using an extruder.

The second composition of the present invention, produced as described above, can be molded into a variety of articles by an ordinary melt-molding method such as an injection molding method, a compression molding method or an extrusion method.

The second composition of the present invention is excellent in economic performance, heat resistance, mechanical properties, flame retardancy, chemical resistance and moldability, and in particular, it has a characteristic feature in that it can be molded under conditions where the mold temperature is low.

According to the present invention, there is also provided a flame-retardant resin composition (to be referred to as "third composition" hereinafter) containing 100 parts by weight of the aromatic polyester (P) of the present invention, 1 to 50 parts by weight of a brominated polymer flame retardant (R) and 5 to 250 parts of a fibrous reinforcement (F).

As the above brominated polymer flame retardant (R), preferred are brominated polystyrene and brominated polyphenylene oxide.

The brominated polystyrene is preferably composed of a recurring unit of the following formula,

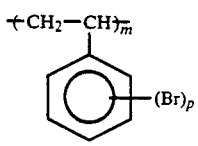

wherein p is an integer of 1 to 5 and m is an integer of 2 or more.

The above brominated polystyrene is produced by polymerizing the corresponding brominated styrene or by brominating polystyrene. The brominated polystyrene may be a copolymer which partially contains a copolymer unit from other vinyl-containing compound. In this case, the vinyl-containing compound includes styrene and α-methylstyrene.

Although the polymerization degree of the brominated polystyrene is not specially limited, the brominated polystyrene preferably has a weight average molecular weight of approximately 5,000 to 1,000,000.

As the brominated polyphenylene oxide, preferred is a compound of the following formula,

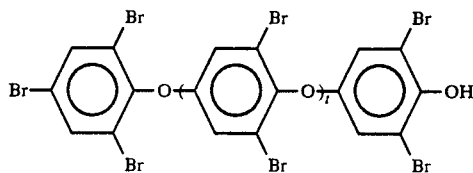

wherein t is an integer of 1 or more.

The above brominated polyphenylene oxide can be produced by reacting 2,6-dibromophenol according to a known oxidation-coupling polymerization method. Although the polymerization degree of the brominated polyphenylene oxide is not specially limited, the brominated polyphenylene oxide preferably has a weight average molecular weight of approximately 2,000 to 1,000,000.

The above flame retardants may be used alone or in combination, as required.

The above flame retardants have a high flame retardancy effect on, and have excellent affinity with, the crystalline aromatic polyester (P) of the present invention.

The fibrous reinforcement (F) is selected from those described regarding the first composition of the present invention. As the fibrous reinforcement, preferred is a glass fiber.

The amount of the brominated polymer flame retardant (R) per 100 parts by weight of the aromatic polyester (P) is 1 to 50 parts by weight. When the amount of the brominated polymer flame retardant (R) per 100 parts by weight of the aromatic polyester (P) is less than 1 part by weight, the resultant resin composition shows insufficient improvement in flame retardancy. When this amount is more than 50 parts by weight, undesirably, the resultant resin composition is affected in mechanical properties and heat resistance.

The amount of the brominated polymer flame retardant (R) based on the above standard is preferably 2 to 30 parts by weight.

The amount of the fibrous reinforcement (F) per 100 parts by weight of the aromatic polyester (P) is 5 to 250 parts by weight. When the above amount of the fibrous reinforcement (F) is less than 5 parts by weight, the reinforcing effect in terms of mechanical properties and heat resistance is insufficient. When this amount is more than 250 parts by weight, the resultant resin composition undesirably shows decreased moldability.

The amount of the fibrous reinforcement (F) based on the same standard is preferably 10 to 200 parts by weight, more preferably 15 to 150 parts by weight.

In addition to the above components, the third composition of the present invention may contain a small amount of other polymer, a variety of stabilizers such as a nucleating agent, an oxidation stabilizer and an ultraviolet absorber, and a variety of additives such as a colorant, a pigment, a lubricant, a plasticizer and a mold-releasing agent. The aromatic polyester (P), the flame retardant (R) and the fibrous reinforcement (F) can be mixed by an ordinary compounding method using an extruder.

The third composition of the present invention is excellent in heat resistance and excellent in mechanical properties, dimensional stability and flame retardancy as compared with conventional polyester-containing resins. Further, the third composition of the present invention has excellent flowability and moldability, and it can be molded into articles having any forms and dimensions by a variety of melt-molding methods. It can be also easily molded into articles having thin thickness.

The third composition of the present invention can be therefore preferably used as a material for forming a variety of articles, particularly, electric and electronic parts required to have heat resistance in soldering.

According to the present invention, lastly, there is provided a molding resin composition (to be referred to as "fourth composition" hereinafter) containing 100 parts by weight of the aromatic polyester (P) of the present invention, 5 to 250 parts by weight of a fiber reinforcement (F) and 0.1 to 5 parts by weight of a mold-releasing agent (M).

As the mold-releasing agent (M), particularly preferred is a compound of the following formula,

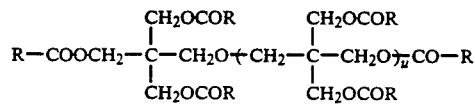

wherein each of a plurality of Rs is independently a monovalent aliphatic moiety having 16 to 30 carbon atoms, and u is 0, 1 or 2.

In the above formula, the monovalent aliphatic moiety having 16 to 30 carbon atoms includes hexadecyl, heptadecyl, octadecyl, nanodecyl, eicosyl, docosyl, tetracosyl, hexacosyl, octacosyl and triacontyl.

The compound of the above formula includes pentaerythritol tetraester when n equals 0, dipentaerythritol hexaester when n equals 1, and tripentaerythritol octaester when n equals 2.

These compounds as mold-releasing agents may be used alone or in combination.

The fibrous reinforcement (F) is selected from those described regarding the first composition of the present invention. As the fibrous reinforcement (F), preferred is a glass fiber.

Per 100 parts by weight of the aromatic polyester (P), the amount of the fibrous reinforcement (F) is 5 to 250 parts by weight, and the amount of the mold-releasing agent (M) is 0.1 to 5 parts by weight.

When the amount of the fibrous reinforcement (F) is less than 5 parts by weight, the reinforcement effect is insufficient in terms of mechanical properties and heat resistance. When this amount is more than 250 parts by weight, the moldability undesirably decreases.

When the amount of the mold-releasing agent (M) per 100 parts by weight of the aromatic polyester (P) is less than 0.1 part by weight, the resultant composition is insufficient in mold releasability and difficult to mold smoothly. When this amount is more than 5 parts by weight, the resultant composition is undesirably liable to be affected in mechanical properties and heat resistance.

The amount of the fibrous reinforcement (F) based on the above standard is preferably 10 to 200 parts by weight, more preferably 15 to 150 parts by weight.

The amount of the mold-releasing agent (M) based on the same standard is preferably 0.2 to 3 parts by weight.

In addition to the above components, the fourth composition of the present invention may contain a small amount of other polymer, a variety of stabilizers such as a nucleating agent, an oxidation stabilizer and an ultraviolet absorber, and a variety of additives such as a colorant, a pigment, a lubricant and a plasticizer.

It is particularly preferred to incorporate 1 to 50 parts by weight, per 100 parts by weight of the aromatic polyester (P), of a flame retardant, preferably a brominated polymer flame retardant. This brominated polymer flame retardant is preferably selected from the brominated polystyrene and brominated polyphenylene oxide described regarding the third composition of the present invention.

The above components can be blended by a known compounding method using an extruder.

The fourth composition of the present invention is excellent in heat resistance over conventional polyester-containing resins, and particularly excellent in mechanical properties and dimensional stability. Further, the fourth composition of the present invention is excellent in flowability and mold releasability, and it hence can be molded into articles having any forms and dimensions by a variety of melt-molding methods.

The present invention will be detailed hereinafter by reference to Examples. In Examples, "part" stands for "part by weight", and polymers were measured for their inherent viscosity values in a phenol/1,1,2,2-tetrachloroethane mixed solvent (weight ratio=60/40) at a temperature of 35° C. with the polymer concentration being set at 0.3 g/dl. Further, the polymers were measured for their melting points (Tm) and second-order transition points (Tg) with DSC at a temperature elevation rate of 10° C./minute. Further, the polymers were measured for their melt-viscosity values with a flow tester at 360° C. at a shear rate of 100/second. Molded articles were measured for their mechanical and thermal properties on the basis of the following standards.
Tensile strength: ASTM D638
Breaking elongation: ASTM D638
Flexural strength: ASTM D790
Flexural modulus: ASTM D790
Impact strength: ASTM D256 (notched)
Thermal deformation temperature: ASTM D648 (18.6 kg/cm$^2$)

EXAMPLE 1 AND COMPARATIVE EXAMPLE 1

166 Parts of isophthalic acid, 88 parts of hydroquinone, 26 parts of neopentylene glycol, 47 parts of phenol, 0.09 part of antimony trioxide and 0.33 part of triphenyl phosphate were charged into a reactor having a stirrer device and a distillation system (isophthalic acid/hydroquinone/neopentylene glycol/phenol molar ratio=100/80/25/50), and heated to 280° C. under nitrogen pressure. The mixture was allowed to react for 5 hours while the pressure was gradually decreased from 5 kg/cm$^2$ to 2 kg/cm$^2$ and while water being formed by the reaction was distilled off out of the reaction system. During this reaction, the amount of the formed water was 30 parts (esterification ratio 83%).

Then, the reaction system was restored to atmospheric pressure, and the above reaction mixture was allowed to react in a nitrogen current for 60 minutes while volatiles were distilled off out of the system. During this reaction, the reaction temperature was increased from 280° C. to 330° C. Then, the pressure of the reaction system was gradually reduced to reach a high vacuum of about 0.5 mmHg over 60 minutes, and the reaction mixture was allowed to react for 60 minutes. The resultant polymer was an excellently crystalline polymer having an inherent viscosity of 0.71, Tm of 321° C. and Tg of 121° C. The polymer had a melt viscosity of 4,700 poise.

For Comparative Example 1, the above procedures were repeated except that the neopentylene glycol was replaced with an equimolar amount of 4,4'-dihydroxydiphenyl, to give a polymer having an inherent viscosity of 0.72. The polymer had a Tm of 329° C., Tg of 163° C. and a melt viscosity of 14,000 poise.

The results show that when the above two polymers are compared, the polymer according to the present invention and the comparative polymer have almost the same melting points, while the polymer according the present invention has lower Tg and lower melt viscosity than the comparative polymer.

EXAMPLE 2

166 Parts of isophthalic acid, 99 parts of hydroquinone, 15.6 parts of neopentylene glycol, 94 parts of phenol, 0.1 part of stannous acetate, 0.34 part of triphenyl phosphate and 100 parts of ethylbenzene were charged into the same reactor as that used in Example 1 (isophthalic acid/hydroquinone/neopentylene glycol/phenol molar ratio=100/90/15/100), and allowed to react by gradually increasing the temperature inside the reactor from 230° C. to 280° C. while the pressure was adjusted such that water being formed by the reaction was azeotropically distilled off together with ethylbenzene. The amount of the water distilled off during the reaction for about 7 hours was 31 parts (esterification ratio 86%).

Then, the reaction system was restored to atmospheric pressure, and the reaction mixture was melt-polymerized in the same manner as in Example 1 except that the final reaction temperature was set at 340° C. and that the time in which the reaction mixture was allowed to react under a high vacuum was set for 40 minutes, to give a polymer. The polymer had an inherent viscosity of 0.52.

The above polymer was allowed to melt-react in a twin-screw co-rotating extruder (L/D 42, 30 mm$\phi$) having two vent openings at a polymer temperature of 350° to 360° C. at a screw rotation of 50 rpm for an average vacuum zone residence time of about 10 minutes. During this reaction, each of the two vent openings was kept vacuum around 1 mmHg by sealing the vacuum zone with sealing portions. The sealing portion was formed by providing a screw element, of which the flight has a reverse incline to that of an ordinary conveying screw, before the vent opening.

The so-obtained polymer were optically isotropic and crystalline and had an inherent viscosity of 0.87, Tm of 351° C. and Tg of 134° C.

COMPARATIVE EXAMPLES 2 AND 3

Example 1 was repeated except that the neopentylene glycol was replaced with an equimolar amount of ethylene glycol (Comparative Example 2) or with an equimolar amount of hexamethylene glycol (Comparative Example 3). In Comparative Example 2 using ethylene glycol, the reaction product was colored and crosslinked during the reaction at high vacuum. In Comparative Example 3 using hexamethylene glycol, the reaction product solidified during the reaction at high vacuum, and the inherent viscosity of the reaction product increased only up to 0.21. This solid reaction product had Tm of 350° C., which was higher than that of the product obtained in Example 1. It is considered that hexamethylene glycol decomposed and decreased.

EXAMPLES 3 AND 4

A predetermined amount of the polyester obtained in Example 2 and a predetermined amount of glass fiber chopped strands having a length of 3 mm (03JA.PX-1, supplied by Asahi Fiber Glass Co., Ltd) were dry-blended and the resulting mixture was melt-blended by means of a single-screw extruder having a screw diameter of 30 mm$\phi$ at a polymer temperature of 360° C. for an average residence time of about 5 minutes. The resultant compound was injection molded with an injection molding machine (N40A, supplied by The Japan Steel Works, Ltd) at a polymer temperature of 360° C. at a molding cycle of 40 to 60 seconds to prepare test pieces.

Table 1 shows the physical properties of the test pieces. It is shown in Table 1 that the resin composition according to the present invention has excellent heat resistance and mechanical properties.

TABLE 1

|   | Example 3 | Example 4 |
| --- | --- | --- |
| Resin of the invention (part) | 60 | 70 |
| Glass fiber (part) | 40 | 30 |
| Tensile strength (kg/cm$^2$) | 1320 | 1060 |
| Flexural strength (kg/cm$^2$) | 1840 | 1580 |
| Flexural modulus (kg/cm$^2$) | 134,000 | 96,000 |
| Impact strength* (kg.cm/cm) | 9.5 | 8.0 |
| Thermal deformation temperature (°C.) | >300° C. | >300° C. |

*Izod, notched, ⅛ inch

EXAMPLE 5

(1) 166 Parts of isophthalic acid, 94 parts of hydroquinone, 21 parts of neopentylene glycol, 94 parts of phenol and 0.09 part of antimony trioxide were charged into a reactor having a distillation system, and heated to 280° C. under nitrogen pressure. The mixture was allowed to react for 5 hours while the pressure was gradually decreased from 5 kg/cm$^2$ to 2 kg/cm$^2$ and while water being formed by the reaction was distilled off out of the system. The amount of the water formed during the reaction was 29 parts. Then, the reaction system was restored to atmospheric pressure, and 0.33 part of triphenyl phosphate was added. The reaction mixture was allowed to react in nitrogen gas current for 60 minutes while volatiles were distilled off out of the system. During this reaction, the reaction temperature was increased from 280° C. to 340° C.

Then, the pressure in the system was gradually reduced to reach a high vacuum of about 0.5 mmHg over 60 minutes, and the reaction mixture was allowed to react for 50 minutes to give a polymer having an inherent viscosity of 0.46.

The above polymer was allowed to melt-react in a twin-screw co-rotating extruder (L/D 42, 30 mm$\phi$) having two vent openings at a polymer temperature of 350° to 360° C. at a screw rotation of 100 rpm for an average vacuum zone residence time of about 8 minutes. During this reaction, each of the two vent openings was kept vacuum around 1 mmHg by sealing the vacuum zone with sealing portions. The sealing portion was formed by providing a screw element, of which the flight has a reverse incline to that of an ordinary conveying screw, before the vent opening. The polymer obtained by the melt-reaction in the extruder had an inherent viscosity of 0.65, Tm (melting point) of 341° C. and Tg (glass transition point) of 132° C.

(2) Predetermined amounts (see Table 2) of the above-produced aromatic polyester, glass fiber chopped strands having a length of 3 mm (03JA PX-1, aspect ratio 230, supplied by Asahi Fiber Glass Co., Ltd) and talc (PKNN, supplied by Hayashi Kasei K. K.) were mixed, and melt-blended by means of a twin-screw counter-rotating extruder (30 mm$\phi$) at a polymer temperature of 360° C. for an average residence time of about 2 minutes.

Each of the above-obtained four compounds was separately injection molded with an injection molding machine (N40A, supplied by The Japan Steel Works, Ltd) at a cylinder temperature of 360° C. at a mold temperature of 150° C. to obtain rectangular-shaped test pieces having a size of 0.8×10×25 mm.

(3) (Test by an infrared reflow apparatus)

The above-prepared test pieces were subjected to an infrared reflow test by an infrared reflow apparatus (TPF-15, supplied by Asahi Engineering K. K.). The test pieces were preliminarily heated to a temperature of 100° to 150° C. for about 80 seconds, and then heated up to peak temperatures of 260° C., 280° C. and 300° C. The surface of each test piece at each peak temperature was observed. Table 2 shows the resin compositions and test results. In the results of the above test, a surface showing no defects such as melting, swelling and deformation was taken as "O", and a surface clearly showing any of such defects was taken as "X".

COMPARATIVE EXAMPLE 4

A commercially available polyphenylene sulfite resin (PPS: trade name "Ryton R-4", supplied by Phillips Petroleum) was injection molded with an injection molding machine (N40A, supplied by The Japan Steel Works, Ltd) at a cylinder temperature of 320° C. at a mold temperature of 140° C. to prepare test pieces similar to those prepared in Example 5. The test pieces were tested in the same manner as in Example 5.

Table 2 shows the results.

COMPARATIVE EXAMPLE 5

A commercially available poly-1,4-cyclohexanedimethylene terephthalate resin (PCT: trade name "Ektar CG907", supplied by Toray Industries, Inc.) was injection molded with an injection molding machine (N40A, supplied by The Japan Steel Works, Ltd) at a cylinder temperature of 300° C. at a mold temperature of 100° C. to prepare test pieces similar to those prepared in Example 5. The test pieces were tested in the same manner as in Example 5.

Table 2 shows the results.

TABLE 2

|  | Example 5 |  |  |  | Comparative Example 4 | Comparative Example 5 |
| --- | --- | --- | --- | --- | --- | --- |
| Resin of the invention (part) | 60 | 59.8 | 69.6 | 57 | PPS | PCT |
| Glass fiber (part) | 40 | 40 | 30 | 40 |  |  |
| Talc (part) | 0 | 2 | 2 | 5 |  |  |
| Peak temperature (°C.) |  |  |  |  |  |  |
| 260 | ○ | ○ | ○ | ○ | ○ | ○ |
| 280 | ○ | ○ | ○ | ○ | X | X |
| 300 | ○ | ○ | ○ | ○ | X | X |

Table 2 clearly shows that aromatic polyester resin composition according to the present invention exhibits remarkably excellent heat resistance and causes no defect on the surface of a molded article in reflow at a high temperature.

EXAMPLE 6

The same aromatic polyester as that produced in Example 5 and glass fiber chopped strands having a length of 3 mm (03JA PX-1, supplied by Asahi Fiber Glass Co., Ltd, aspect ratio 230) were mixed in a weight ratio of 60/40, and the resultant mixture was melt-blended in a twin-screw counter-rotating extruder (30 mmφ) at a polymer temperature of 360° C. for an average residence time of about 2 minutes.

The above-obtained compound was injection molded with an injection molding machine (N40A, supplied by The Japan Steel Works, Ltd) at a cylinder temperature of 360° C. at a mold temperature of 160° C. to prepare test pieces (0.8×10×25 mm) for evaluation of heat resistance in soldering.

The above-prepared test pieces were tested on the heat resistance in soldering by means of infrared reflow (infrared reflow apparatus: TPF-15, supplied by Asahi Engineering K. K.). The test pieces were preliminarily heated to a temperature of 100° to 150° C. for about 80 seconds, and then heated up to peak temperatures of 280° C. and 300° C. The surface of the test pieces at each peak temperature was observed. Table 3 shows the results. The test results were evaluated on the basis of the same standard as that described in Example 5.

TABLE 3

| Temperature (°C.) | Test pieces prepared in Example 6 | Test pieces prepared from PPS |
| --- | --- | --- |
| 280 | ○ | X |
| 300 | ○ | X |

For comparison, Table 3 also shows the results of the heat resistance test of test pieces which were prepared from PPS resin (Ryton R-4, supplied by Phillips Petroleum) at a cylinder temperature of 320° C. at a mold temperature of 140° C. and had the same size as that of the above test pieces. Table 3 shows that a print circuit substrate prepared from the resin composition according to the present invention has remarkably higher heat resistance than a print circuit substrate prepared from PPS.

EXAMPLE 7

The same aromatic polyester as that produced in Example 5 and glass fiber chopped strands having a length of 3 mm (03JA PX-1, supplied by Asahi Fiber Glass Co., Ltd, aspect ratio 230) were mixed in a weight ratio of 60/40, and the resultant mixture was melt-blended in a twin-screw counter-rotating extruder (30 mmφ) at a polymer temperature of 360° C. for an average residence time of about 2 minutes.

The above-obtained compound was injection molded with an injection molding machine (N40A, supplied by The Japan Steel Works, Ltd) at a cylinder temperature of 360° C. at a mold temperature of 160° C. into 24-pin (12 pins×2 rows) connectors (insulating portion) having a size of 20×5×5 mm.

The so-obtained connectors (insulating portion) were filled completely up to their thin wall portions, and were free from sink marks and burrs.

Then, the above connectors were subjected to a heat resistance test by means of infrared reflow (infrared reflow apparatus: TPF-15, supplied by Asahi Engineering K. K.). The connectors were preliminarily heated to a temperature of 100° to 150° C. for about 80 seconds, and then heated up to peak temperatures of 280° C. and 300° C. The surfaces of the connectors at each peak temperature were observed. Table 4 shows the results. The test results were evaluated on the basis of the same standard as that described in Example 5.

TABLE 4

| Temperature (°C.) | Connectors prepared in Example 7 | Connectors prepared from PPS |
| --- | --- | --- |
| 280 | ○ | X |
| 300 | ○ | X |

For comparison, Table 4 also shows the results of the heat resistance test of connectors prepared from PPS resin (Ryton R-4, supplied by Phillips Petroleum) at a cylinder temperature of 320° C. at a mold temperature of 140° C. Table 4 shows that a connector prepared from the resin composition according to the present invention has remarkably higher heat resistance than a connector prepared from PPS.

EXAMPLES 8-10

Predetermined amounts (see Table 5) of the same aromatic polyester as that produced in Example 5, one of PPS, LCPII and PET, glass fiber chopped strands having a length of 3 mm (03JA PX-1, aspect ratio 230, supplied by Asahi Fiber Glass Co., Ltd) and talc (PKNN, supplied by Hayashi Kasei K. K.) were mixed, and melt-blended by means of a twin-screw counter-rotating extruder (30 mmφ) extruder at a polymer temperature of 350° C. for an average residence time of about 2 minutes.

Each of the above-prepared compounds was subjected to a 0.7 mm-thick-bar flow test with an injection molding machine (N40A, supplied by The Japan Steel Works, Ltd) at a cylinder temperature of 350° C. under mold temperature and injection pressure conditions shown in Table 5, and these compounds were compared on their moldability on the basis of their flow lengths.

As the above PPS, used was "Ryton" (supplied by Phillips Petroleum), and as the LCPII, used was "Vectra" (supplied by Polyplastics Co., Ltd). The above PET had an inherent viscosity of 0.71.

Further, each of the compounds was injection molded at a molding cycle of 40 to 60 seconds to prepare test pieces for the evaluation of their physical properties, and the test pieces were tested. Table 5 shows the results.

TABLE 5

|  | Example | | |
|---|---|---|---|
|  | 8 | 9 | 10 |
| Resin of the invention (part) | 40 | 40 | 40 |
| Additional resin | PPS | LCPII | PET |
| Amount of additional resin (part) | 20 | 20 | 20 |
| Amount of glass fiber (part) | 40 | 40 | 40 |
| Talc (part) | 0.5 | 0.5 | 0.5 |
| Bar flow test | | | |
| Mold temperature (°C.) | 100 | 100 | 90 |
| Injection pressure (T/cm$^2$) | 1.0 | 1.0 | 1.0 |
| Flow length (mm) | 59 | 75 | 51 |
| Physical properties | | | |
| Tensile strength (kg/cm$^2$) | 1260 | 1700 | 1500 |
| Tensile elongation (%) | 2.5 | 3.4 | 3.1 |
| Flexural strength (kg/cm$^2$) | 1760 | 1950 | 2230 |
| Flexural modulus (kg/cm$^2$) (× 10$^4$) | 13 | 12 | 11 |
| Impact strength (kg.cm/cm) (notched) | 12 | 7 | 12 |
| Thermal deformation temperature (°C.) | >300 | 270 | 220 |

EXAMPLES 11–14

(1) 166 Parts of isophthalic acid, 96 parts of hydroquinone, 18 parts of neopentylene glycol, 94 parts of phenol and 0.09 part of antimony trioxide were charged into a reactor having a stirring device and a distillation system, and heated to 280° C. under nitrogen pressure. The mixture was allowed to react for 5 hours while the pressure was gradually decreased from 5 kg/cm$^2$ to 2 kg/cm$^2$ and while water being formed by the reaction was distilled off out of the system. The amount of the water formed during the reaction was 30 parts. Then, the reaction system was restored to atmospheric pressure, and 0.33 part of triphenyl phosphate was added. The reaction mixture was allowed to react in nitrogen gas current for 60 minutes while volatiles were distilled off out of the system. During this reaction, the reaction temperature was increased from 280° C. to 340° C.

Then, the pressure in the system was gradually reduced to reach a high vacuum of about 0.5 mmHg over 60 minutes, and the reaction mixture was allowed to react for 65 minutes to give a polymer having an inherent viscosity of 0.47.

The above polymer was allowed to melt-react in a twin-screw co-rotating extruder (L/D 42, 30 mm$\phi$) having two vent openings at a polymer temperature of 360° C. at a screw rotation of 100 rpm for an average vacuum zone residence time of about 8 minutes. During this reaction, each of the two vent openings was kept vacuum around 1 mmHg by sealing the vacuum zone with sealing portions. The sealing portion was formed by providing a screw element, of which the flight has a reverse incline to that of an ordinary conveying screw, before the vent opening. The polymer obtained by the melt-reaction in the extruder had an inherent viscosity of 0.64, Tm (melting point) of 345° C. and Tg (glass transition point) of 136° C.

(2) 100 Parts of the above-obtained polymer (semicrystalline aromatic copolyester) was dry-blended with 65 parts of glass fiber chopped strands having a length of 3 mm, 0.8 parts of talc and a flame retardant shown in Table 6, and the resultant mixture was melt-blended in a 30 mm$\phi$ oppositely rotating two-screw extruder at a polymer temperature of 360° C. for an average residence time of about 2 minutes.

The so-obtained compound was injection molded with an injection molding machine (N40A, supplied by The Japan Steel Works, Ltd) at a cylinder temperature of 360° C. at a mold temperature of 140° C. to prepare test pieces for evaluation of physical properties.

Table 6 shows the physical properties of the so-obtained molded articles (test pieces).

TABLE 6

| Example | 11 | 12 | 13 | 14 |
|---|---|---|---|---|
| Flame retardant (added amount) | Brominated polystyrene (3 parts) | Brominated polystyrene (5 parts) | Brominated polyphenylene oxide (5 parts) | — |
| Tensile strength (kg/cm$^2$) | 1230 | 1040 | 1050 | 1320 |
| Flexural strength (kg/cm$^2$) | 1700 | 1540 | 1570 | 1750 |
| Flexural modulus (kg/cm$^2$) | 110,000 | 104,000 | 103,000 | 128,000 |
| Impact strength (kg.cm/cm) ⅛ inch, notched | 6.2 | 5.7 | 5.8 | 8.7 |
| Thermal deformation temperature (18.6 kg, °C.) | 290 | 282 | 270 | 288 |
| Flame retardancy 1/32 inch UL94 | V-O | V-O | V-O | V-1 |

(Notes)
Brominated polystyrene: PYRO-CHEK 68PB, supplied by FERRO CORPORATION. Brominated polyphenylene oxide; PO-64P, supplied by Great Lakes.

As shown in the above Table 6, the resin composition according to the present invention is excellent in mechanical properties and heat resistance, and it shows a flame retardancy corresponding to V-0 when a 1/32 inch sample formed therefrom is evaluated by UL-94 or is excellent in flame retardancy.

EXAMPLES 15–18

100 Parts of the polymer (semicrystalline aromatic copolyester) prepared in Examples 11 to 13, (1), was dry-blended with 65 parts of glass fiber chopped strands having a length of 3 mm (03JA PX-1, supplied by Asahi Fiber Glass Co., Ltd), 0.8 parts of talc (PKNN, supplied by Hayashi Kasei K. K.) and a predetermined amount of a mold-releasing agent shown in Table 7, and the resultant mixture was melt-blended in a twin-screw counter-rotating extruder (30 mmφ) at a polymer temperature of 350° C. for an average residence time of about 2.5 minutes.

The above-obtained resin composition was injection molded with an injection molding machine (Autoshot Mate, supplied by Fanuc) at a polymer temperature of 360° C. at a mold temperature of 150° C. to prepare 24-pin (12×2 rows) connectors having a size of 20×5×5 mm. The resin composition was evaluated by measuring a load exerted on an extrusion pin when the molded articles (connectors) were released from the mold.

Table 7 shows the results. It is shown in Table 7 that the composition according to the present invention is excellent in heat resistance, mechanical properties and mold releasability.

TABLE 7

| Example | 15 | 16 | 17 | 18 |
|---|---|---|---|---|
| Mold releasability | VPG861 | VPG861 | VPN920 | VPN920 |
| (added amount, part) | (0.8) | (1.6) | (0.4) | (0.8) |
| Load on extrusion pin (kg/cm$^2$) | 8.7 | 2.1 | 8.4 | 2.0 |
| Tensile strength (kg/cm$^2$) | 1240 | 1150 | 1350 | 1370 |
| Flexural strength (kg/cm$^2$) | 1920 | 1770 | 1800 | 1880 |
| Flexural modulus (kg/cm$^2$) | 118,000 | 118,000 | 116,000 | 117,000 |
| Impact strength* (kg.cm/cm) | 8.4 | 7.0 | 8.5 | 8.4 |
| Thermal deformation temperature (.C) | 288 | 290 | 286 | 285 |

Note)
VPG861: Pentaerythritol tetrastearate produced by Henckel Hakusui K.K.
VPN920: Tripentaerythritol octastearate produced by Henckel Hakusui K.K.
*Izod, notched, ⅛ inch

EXAMPLES 19 AND 20

Example 3 was repeated except that the glass fiber chopped strands having a length of 3 mm were replaced with a chopped carbon fiber having a length of 3 mm (T-300, supplied by Toray Industries, Inc.) or a chopped aramid fiber having a length of 1 mm (Technora, supplied by Teijin Ltd) in an amount shown in Table 8, to obtain injection molded articles. The injection molded articles were measured for their physical properties. Table 8 shows the results.

TABLE 8

| | Example | |
|---|---|---|
| | 19 | 20 |
| Resin of the invention (part) | 90 | 90 |
| Filler | Carbon fiber | Aramid fiber |
| Filler amount (part) | 10 | 10 |
| Tensile strength (kg/cm$^2$) | 570 | 350 |
| Tensile elongation (%) | 1.5 | 2.9 |
| Flexural strength (kg/cm$^2$) | 770 | 490 |
| Flexural modulus (kg/cm$^2$) | 64,000 | 42,000 |
| Impact strength* (kg.cm/cm) | 1.7 | 1.7 |
| Thermal deformation temperature (°C.) | 167 | 139 |

*Izod, notched, ⅛ inch

What is claimed is:

1. An aromatic polyester:
(1) consisting essentially of a polymer unit A of the formula (1),

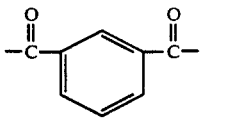

a polymer unit B of the formula (2),

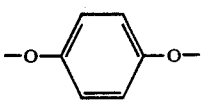

and a polymer unit C of the formula (3),

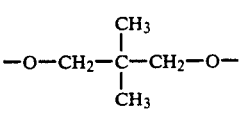

the above polymer units being bonded together forming ester linkages in a polymer chain,
(2) the amount of the polymer unit C is 10 to 35 mol % based on the total amount of the polymer units B and C,
(3) the polyester being semicrystalline,
(4) the polyester having an inherent viscosity, measured in a phenol/1,1,2,2-tetrachloroethane mixed solvent (weight ratio=60/40) at 35° C., of at least 0.3.

2. An aromatic polyester according to claim 1, which consists essentially of a recurring unit AB of the formula (1-2),

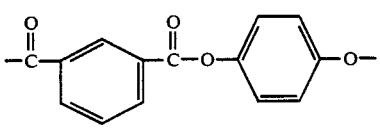

and a recurring unit AC of the formula (1-3),

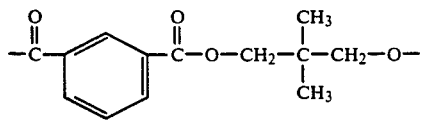

(1-3)

the molar ratio of the recurring unit AB/recurring unit AC molar ratio being 90/10 to 65/35.

3. An aromatic polyester of claim 1, which has a melting point of 380° to 280° C.

4. A process for producing a semicrystalline aromatic polyester having an inherent viscosity, measured in a phenol/1,1,2,2-tetrachloroethane mixed solvent (weight ratio=60/40) at 35° C., of at least 0.3, which comprises heat-melting a starting material consisting substantially of isophthalic acid (a), hydroquinone (b) and neopentylene glycol (c) in amounts which simultaneously satisfy the following expressions (i) and (ii), $$1.3 \geq (B+C)/A \geq 0.9 \qquad (i)$$

$$90/10 \geq B/C \geq 65/35 \qquad (ii)$$

wherein A is a molar amount of the isophthalic acid (a), B is a molar amount of the hydroquinone (b) and C is a molar amount of the neopentylene glycol (c), in the presence of an esterifying catalyst.

5. A process according to claim 4, wherein the heat-melting is carried out under conditions where a phenol (d) optionally substituted with an alkyl group having 1 to 5 carbon atoms is further present in an amount which satisfies the expression (iii)

$$D/A \leq 10 \qquad (iii)$$

wherein A is as defined above and D is a molar amount of the phenol (d).

6. A process according to claim 5, wherein the starting materials are first heat-melted until at least about 50 of carboxyl groups of the starting materials are esterified while water formed is distilled off out of a reaction system under conditions such that the phenol (A) is essentially not distilled off from the reaction system, and then a resultant reaction mixture is heat-melted while formed water and the phenol (d) are distilled off out of the reaction system thereby to achieve an esterification ratio of at least 50%.

7. A molding resin composition containing 100 parts by weight of the aromatic polyester (P) recited in claim 1 and 5 to 250 parts by weight of a fibrous reinforcement (F).

8. The composition of claim 7, wherein the amount of the fibrous reinforcement (F) is 10 to 200 parts by weight.

9. The composition of claim 7, wherein the fibrous reinforcement is a glass fiber.

10. The composition of claim 7, further containing a nucleating agent (N) in an amount of 0.1 to 10 parts by weight per 100 parts by weight of the aromatic polyester.

11. The composition of claim 10, wherein the nucleating agent (N) is talc.

12. A molding resin composition containing 100 parts by weight of the aromatic polyester (P) recited in claim 1, 1 to 200 parts by weight of a crystalline thermoplastic resin other than the above aromatic polyester (P), and 5 to 250 parts by weight, per 100 parts by weight of the aromatic polyester (P) and the crystalline thermoplastic resin in total, of a fibrous reinforcement (F).

13. The composition of claim 12, wherein the thermoplastic resin is selected from the group consisting of an aromatic polyester, polyphenylene sulfide, liquid-crystal wholly aromatic polyester and polyether ketone.

14. The composition of claim 12, wherein the amount of the fibrous reinforcement (F) is 10 to 200 parts by weight.

15. The composition of claim 12, wherein the fibrous reinforcement (F) is a glass fiber.

16. The composition of claim 12, further containing a nucleating agent (N) in an amount of 0.1 to 10 parts by weight per 100 parts by weight of the aromatic polyester.

17. The composition of claim 16, wherein the nucleating agent (N) is talc.

18. A flame-retardant resin composition containing 100 parts by weight of the aromatic polyester (P) recited in claim 1, 1 to 50 parts by weight of a brominated polymer flame retardant (R) and 5 to 250 parts by weight of a fibrous reinforcement (F).

19. The composition of claim 18, wherein the brominated flame retardant (R) is selected from brominated polystyrene or brominated polyphenylene oxide.

20. The composition of claim 18, wherein the fibrous reinforcement (F) is a glass fiber.

21. The composition of claim 18, wherein the amount of the fibrous reinforcement (F) is 10 to 200 parts by weight.

22. A molding resin composition containing 100 parts by weight of the aromatic polyester (P) recited in claim 1, 5 to 250 parts by weight of a fibrous reinforcement (F) and 0.1 to 5 parts by weight of a mold-releasing agent (M).

23. The composition of claim 22, wherein the fibrous reinforcement (F) is a glass fiber.

24. The composition of claim 22, wherein the amount of the fibrous reinforcement (F) is 10 to 200 parts by weight.

25. The composition of claim 22, wherein the mold-releasing agent (M) has the following formula,

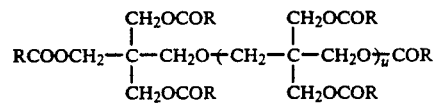

wherein each of a plurality of Rs is independently a monovalent aliphatic moiety having 16 to 30 carbon atoms, and u is 0, 1 or 2.

26. The composition of claim 22, further containing a brominated polymer flame retardant in an amount of 1 to 50 parts by weight.

27. The composition of claim 26, wherein the brominated polymer flame retardant is selected from brominated polystyrene or brominated polyphenylene oxide.

* * * * *